(12) United States Patent
Droux et al.

(10) Patent No.: US 11,881,019 B2
(45) Date of Patent: Jan. 23, 2024

(54) METHOD AND DEVICE FOR TRACKING AND EXPLOITING AT LEAST ONE ENVIRONMENTAL PARAMETER

(71) Applicant: CORTEXIA SA, Châtel-St-Denis (CH)

(72) Inventors: André Droux, Granges-Veveyse (CH); Andreas Von Kaenel, Vufflens-la-Ville (CH)

(73) Assignee: CORTEXIA SA, Châtel-St-Denis (CH)

( * ) Notice: Subject to any disclaimer, the term of this patent is extended or adjusted under 35 U.S.C. 154(b) by 0 days.

(21) Appl. No.: 17/278,067

(22) PCT Filed: Sep. 19, 2019

(86) PCT No.: PCT/IB2019/057921
§ 371 (c)(1),
(2) Date: Mar. 19, 2021

(87) PCT Pub. No.: WO2020/058905
PCT Pub. Date: Mar. 26, 2020

(65) Prior Publication Data
US 2021/0350127 A1    Nov. 11, 2021

(30) Foreign Application Priority Data
Sep. 20, 2018 (WO) .................. PCT/IB2018/057252

(51) Int. Cl.
*G06K 9/00* (2022.01)
*B64C 39/02* (2023.01)
(Continued)

(52) U.S. Cl.
CPC ............ *G06V 20/13* (2022.01); *B64C 39/024* (2013.01); *G05D 1/0219* (2013.01);
(Continued)

(58) Field of Classification Search
CPC ...... G06V 20/176; G06V 20/56; G06V 20/13; B64C 39/024; B64C 2201/127;
(Continued)

(56) References Cited

U.S. PATENT DOCUMENTS 8,965,117 B1   2/2015   Rybakov et al.
2007/0021944 A1*   1/2007   Levy .................... G05D 1/0297
                                                    702/188

(Continued)

FOREIGN PATENT DOCUMENTS

CN   102283616   12/2011
CN   103565366   2/2014
(Continued)

OTHER PUBLICATIONS

International Search Report for PCT/IB2019/057921, dated Jan. 20, 2020, 5 pages.
(Continued)

*Primary Examiner* — Alazar Tilahun
(74) *Attorney, Agent, or Firm* — Nixon & Vanderhye P.C.

(57) ABSTRACT

Method for tracking and exploiting at least one environmental parameter such as cleanness in an urban setting; method comprising the following successive steps: —Planning measurements of at least one environmental parameter; —Tracking in real-time said parameter by means of a camera located on-board a vehicle or fastened to a static holder; —Geopositioning the parameter; —Classifying the parameter depending on the characteristics thereof, such as category, danger or typology; —Improving the environmental parameter based on the data obtained in the 2 preceding steps. The invention also relates to a device using said method.

15 Claims, 10 Drawing Sheets

(51) Int. Cl.
*G05D 1/02* (2020.01)
*G06V 20/13* (2022.01)
*G06V 20/10* (2022.01)
*G06V 20/56* (2022.01)
*B64U 101/30* (2023.01)

(52) U.S. Cl.
CPC ............ *G06V 20/176* (2022.01); *G06V 20/56* (2022.01); *B64U 2101/30* (2023.01); *G05D 2201/0203* (2013.01); *G05D 2201/0213* (2013.01)

(58) Field of Classification Search
CPC ......... G05D 1/0219; G05D 2201/0203; G05D 2201/0213; A47L 2201/00
See application file for complete search history.

(56) References Cited

U.S. PATENT DOCUMENTS

| 2016/0232498 | A1 | 8/2016 | Tomlin, Jr. et al. | |
|---|---|---|---|---|
| 2018/0074496 | A1* | 3/2018 | Gordon | G05D 1/0088 |
| 2018/0148900 | A1* | 5/2018 | Rohrbaugh | E01H 1/0818 |

FOREIGN PATENT DOCUMENTS

| CN | 105512666 | 4/2016 |
|---|---|---|
| CN | 105787506 | 7/2016 |
| CN | 105844337 | 8/2016 |
| CN | 106203498 | 12/2016 |
| CN | 106296422 | 1/2017 |
| CN | 106845408 | 6/2017 |
| CN | 107622231 | 1/2018 |
| CN | 206842237 | 1/2018 |
| EP | 2 400 319 | 12/2011 |
| EP | 3 032 369 | 6/2016 |
| EP | 3 208 753 | 8/2017 |
| KR | 101410286 | 6/2014 |
| KR | 10-2017-0128648 | 11/2017 |

OTHER PUBLICATIONS

Written Opinion of the ISA for PCT/IB2019/057921, dated Jan. 20, 2020, 6 pages.
Assisted Patent Search for 18-40096, issued Apr. 30, 2018, 14 pages.
Li et al., "A Mutilple-Level Assessment System for Smart City Street Cleanliness", Proceedings of the 30th International Conference on Software Engineering and Knowledge Engineering, vol. 2018, Jul. 1, 2018, pp. 256-303.
Jeongmin Jeon et al., "Autonomous Robotic Street Sweeping: Initial Attempt for Curbside Sweeping", 2017 IEEE International Conference on Consumer Electronics (ICCE), pp. 72-73, Jan. 8, 2017.
European Office Action for Application No. 19 794 248.5, two pages, dated Feb. 23, 2023.
Rad et al. "A Computer Vision System to Localize and Classify Wastes on the Streets," Publication Date Oct. 11, 2017, Computer Vision Systems, https://link.springer.com/chapter/10.1007/978-3-319-68345-4_18, Springer International Publishing, pp. 195-204, From the 11th International Conference on Computer Vision Systems, ICVS 2017, Shenzhen, China, Held Jul. 10-13, 2017.
Author Unknown, "How Clean Is Your City?: Littering Quantification by Object Detection Using Hierarchical Similarity Trees", Publication Date Unknown, Date of Submission Jul. 5, 2018.

* cited by examiner

METHOD AND DEVICE FOR TRACKING AND EXPLOITING AT LEAST ONE ENVIRONMENTAL PARAMETER

This application is the U.S. national phase of International Application No. PCT/IB2019/057921 filed 19 Sep. 2019, which designated the U.S. and claims priority to International Application PCT/IB2018/057252 filed 20 Sep. 2018, the entire contents of each of which are hereby incorporated by reference.

FIELD OF THE INVENTION

The field of the invention is that of planning, measurement, monitoring and actuable actions by virtue of the analysis of environmental parameters detected by means of a camera, such as cleanliness in an urban setting.

PRIOR ART

The detection of cleanliness in an urban setting is described in particular in patent applications CN 106203498 and CN 106845408.

Methods for detecting or analyzing cleanliness are described in particular by national associations taking action against littering.

GENERAL DESCRIPTION OF THE INVENTION

The present invention constitutes an improvement over the systems and methods of the prior art.

It relates to a method for monitoring and using at least one environmental parameter which comprises the following successive steps:
  planning of measurements of at least one environmental parameter
  monitoring of said parameter in real-time by means of at least one camera on board a vehicle or secured to a static support;
  geolocation of the parameter
  classification of the parameter according to the characteristics thereof such as category, danger or typology
  improvement of the environmental parameter, e.g. of cleanliness, based on the data obtained in the two preceding steps.

The invention also relates to a device that uses the aforementioned method.

In the present document, what is meant by "environmental parameter" is a variable element that is natural or results from human, animal or plant activity, which may be detected by means of at least one camera.

Examples of environmental parameters forming part of the field of the invention are cited below in a non-exhaustive manner: Cleanliness in an urban setting, ice, traffic, population density, snow cover, fire outbreaks, temperatures, noise, light pollution.

The camera according to the invention preferably operates in the visible range but its use is not limited to this region of the electromagnetic spectrum. It may, for example, operate, as an alternative or in addition to the visible, in the infrared (e.g. for measuring temperatures) or the ultraviolet (e.g. for analysis of UV radiation).

The device according to the invention consists of at least one camera arranged in a vehicle, e.g. a bicycle, a street sweeper, a drone or on a fixed element, e.g. a lamp post. The camera is connected to a central unit arranged on the vehicle, the static support or in a remote location. The central unit processes the images in real time. The images are analyzed by databases located on servers, e.g. in the cloud, and by virtue of algorithms, elements (e.g. litter) are identified, classified, geolocated and presented on a monitoring interface, and reports of results from analyses are displayed by period and by type of information selected.

DETAILED DESCRIPTION OF THE INVENTION

The invention is described in greater detail in this chapter, by means of examples illustrated by the following figures.

Figure 5A:
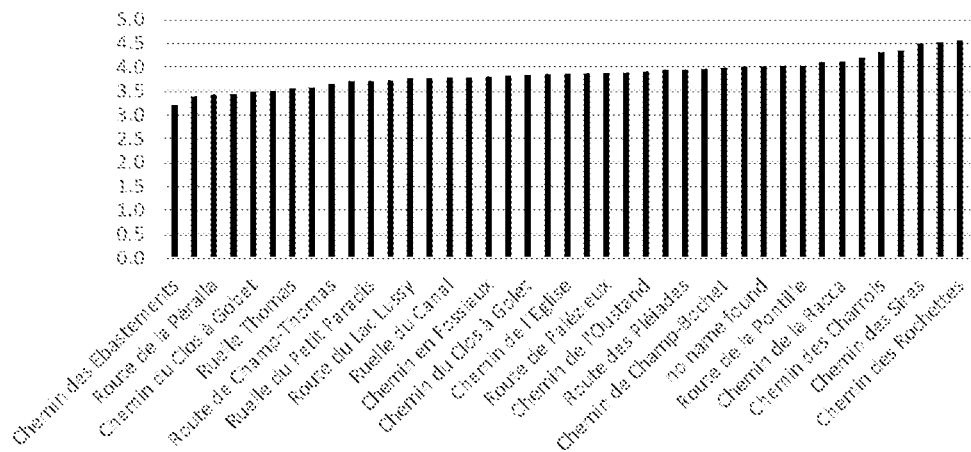
Figure 5B:
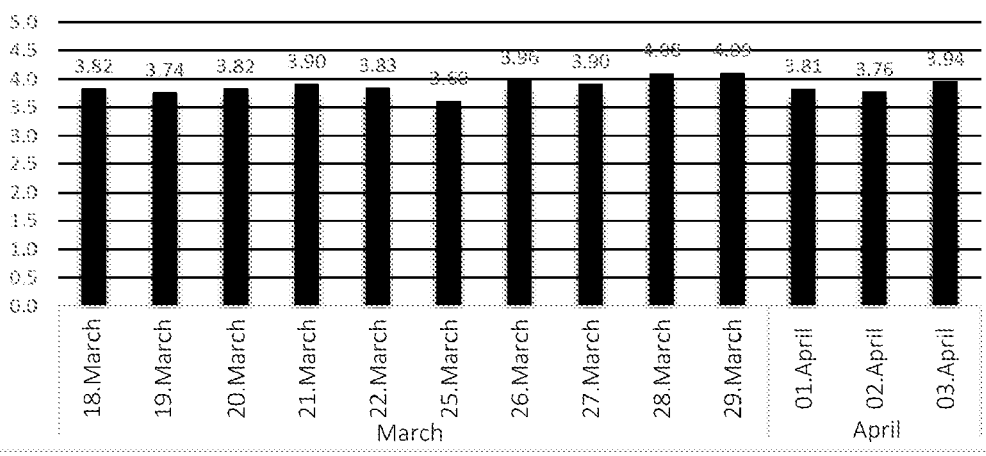
Figure 5C:
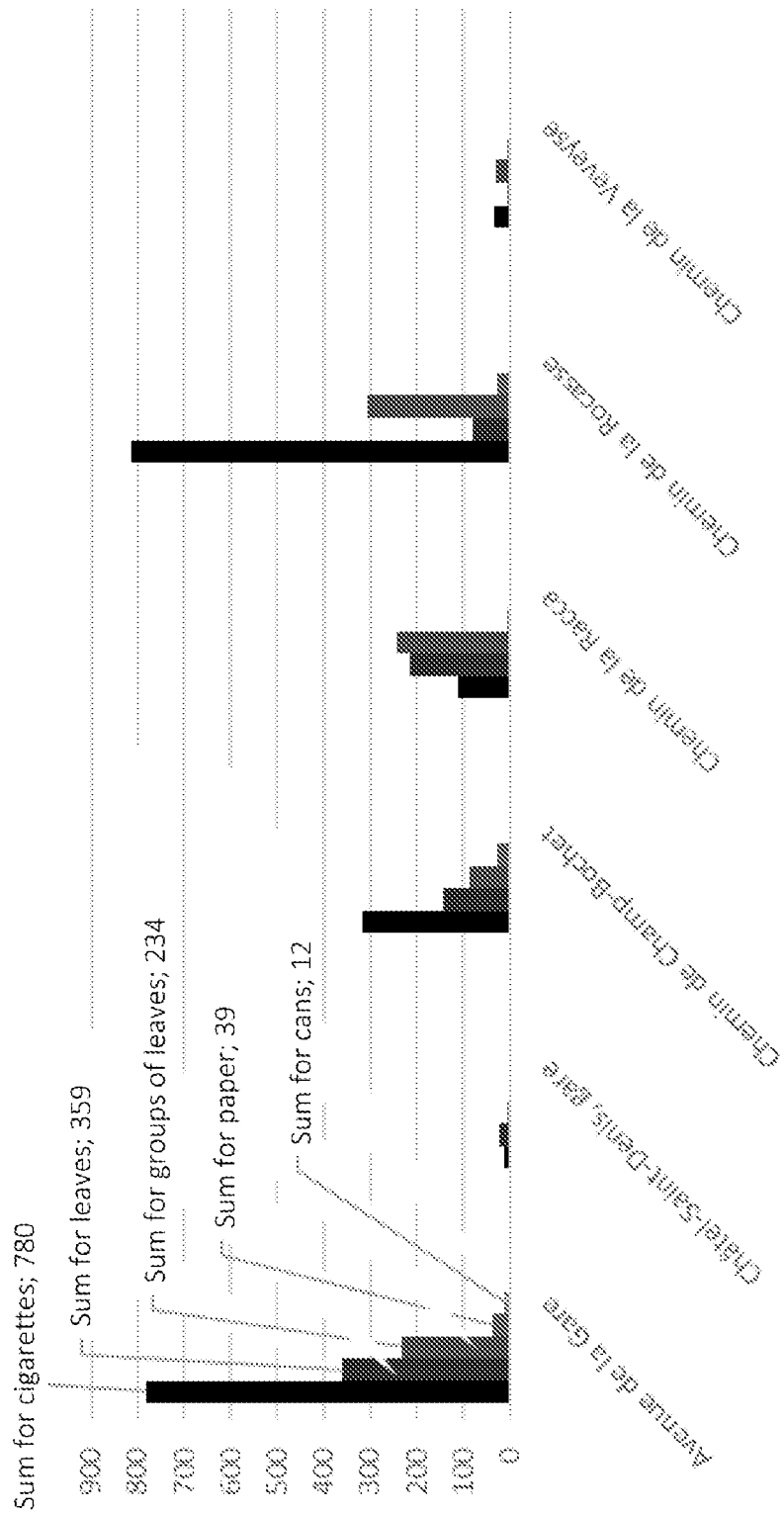
Figure 6:
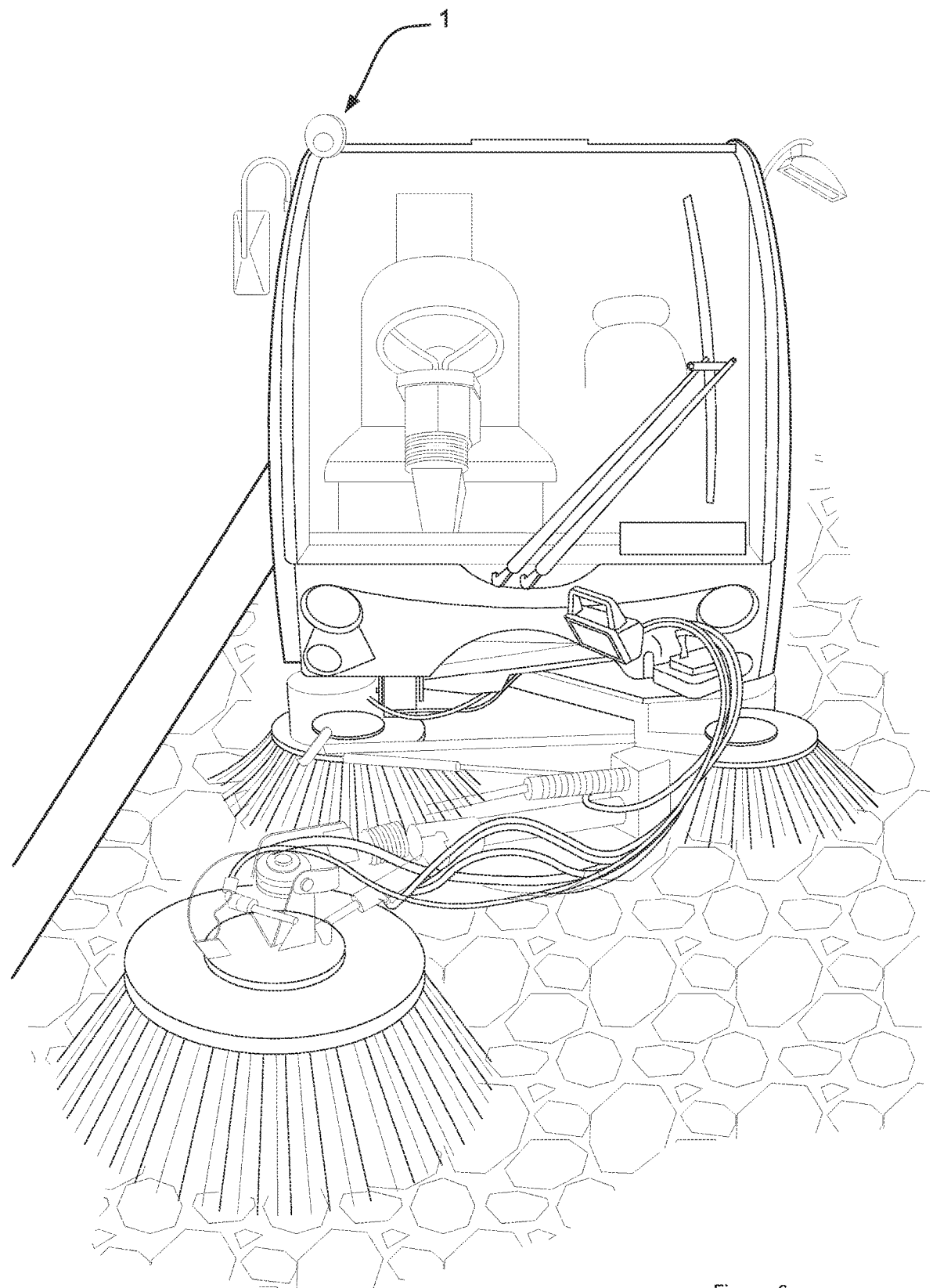
Figure 7:
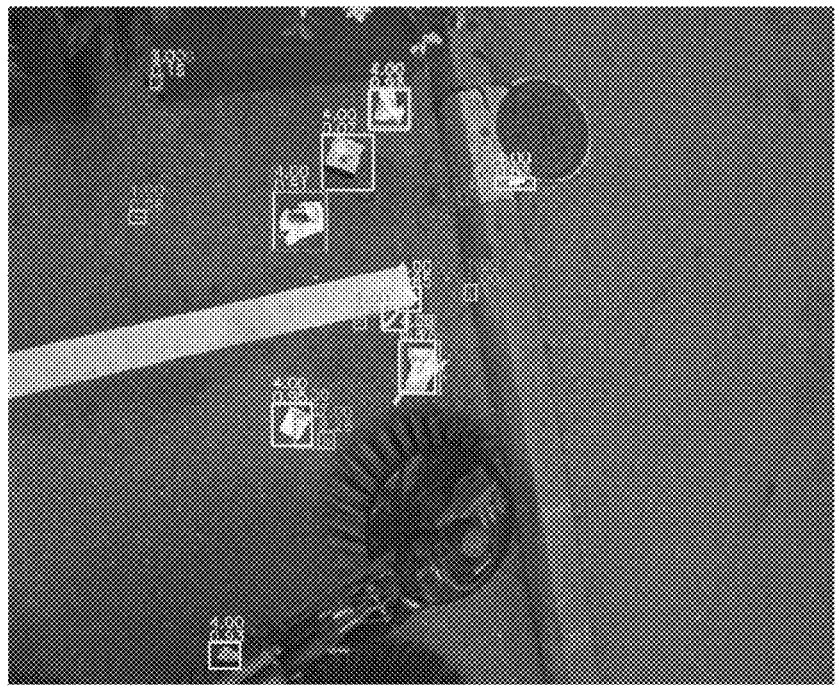
Figure 8:
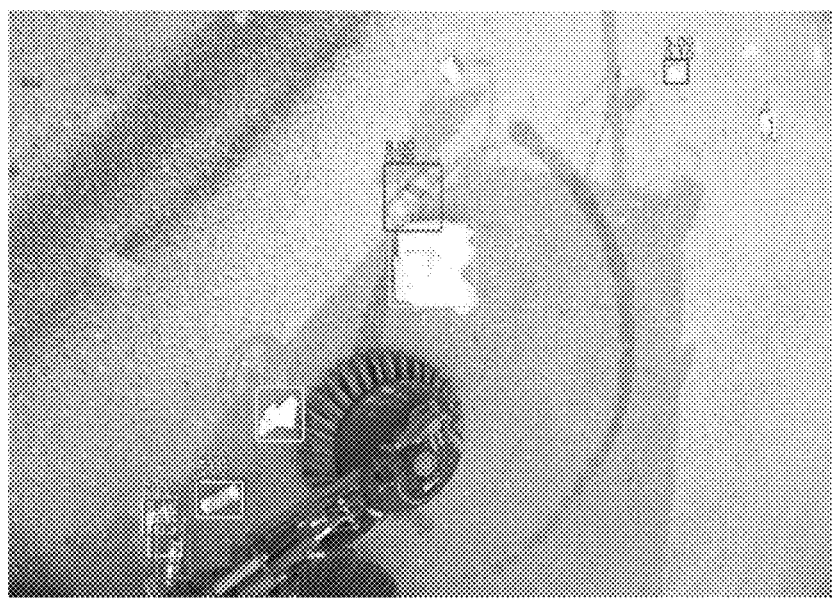
Figure 9:
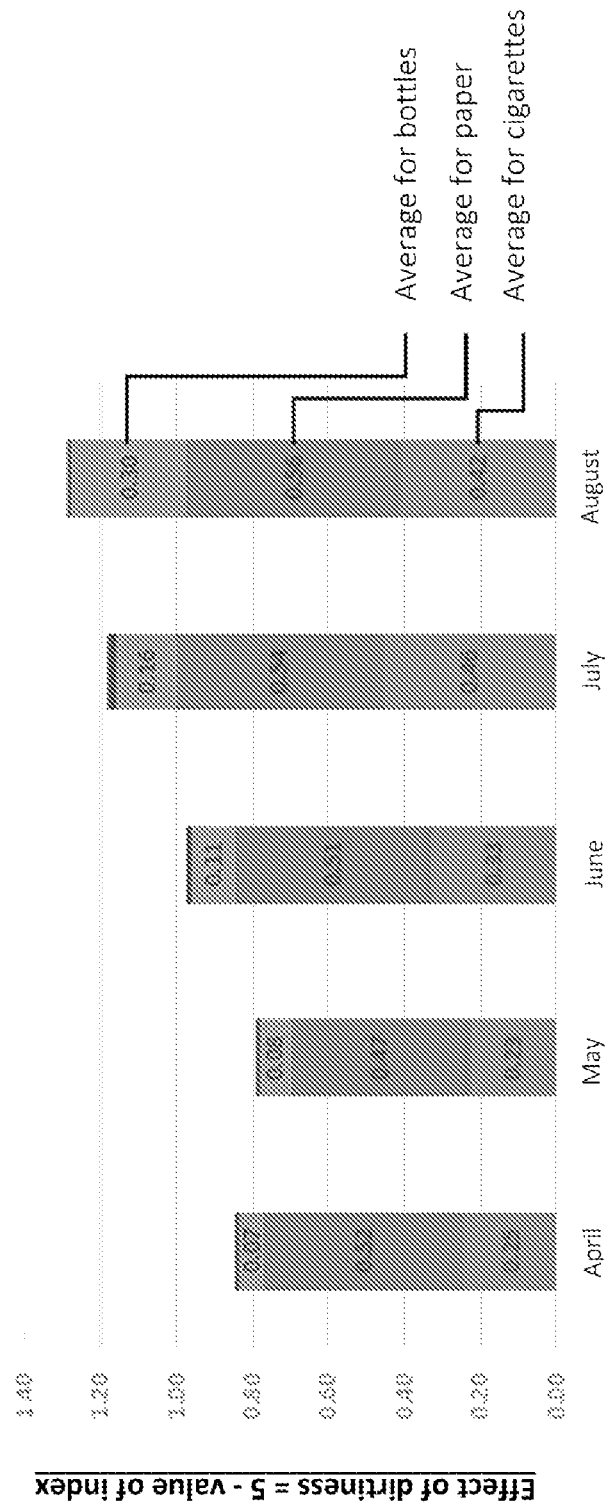

FIGS. 5a, 5b, and 5c illustrate various types of city cleanliness reports;

FIG. 6 illustrates one variant of the invention in which a camera is secured to a street sweeper;

FIG. 7 shows one example of the viewing of litter by a street sweeper;

FIG. 8 shows another example of the viewing of litter by a street sweeper;

FIG. 9 illustrates one example serving as a basis for a continuous improvement tool by presenting the causes of the effect of types of litter on a cleanliness index and therefore the types of litter on which it is necessary to work.

Figure 10:
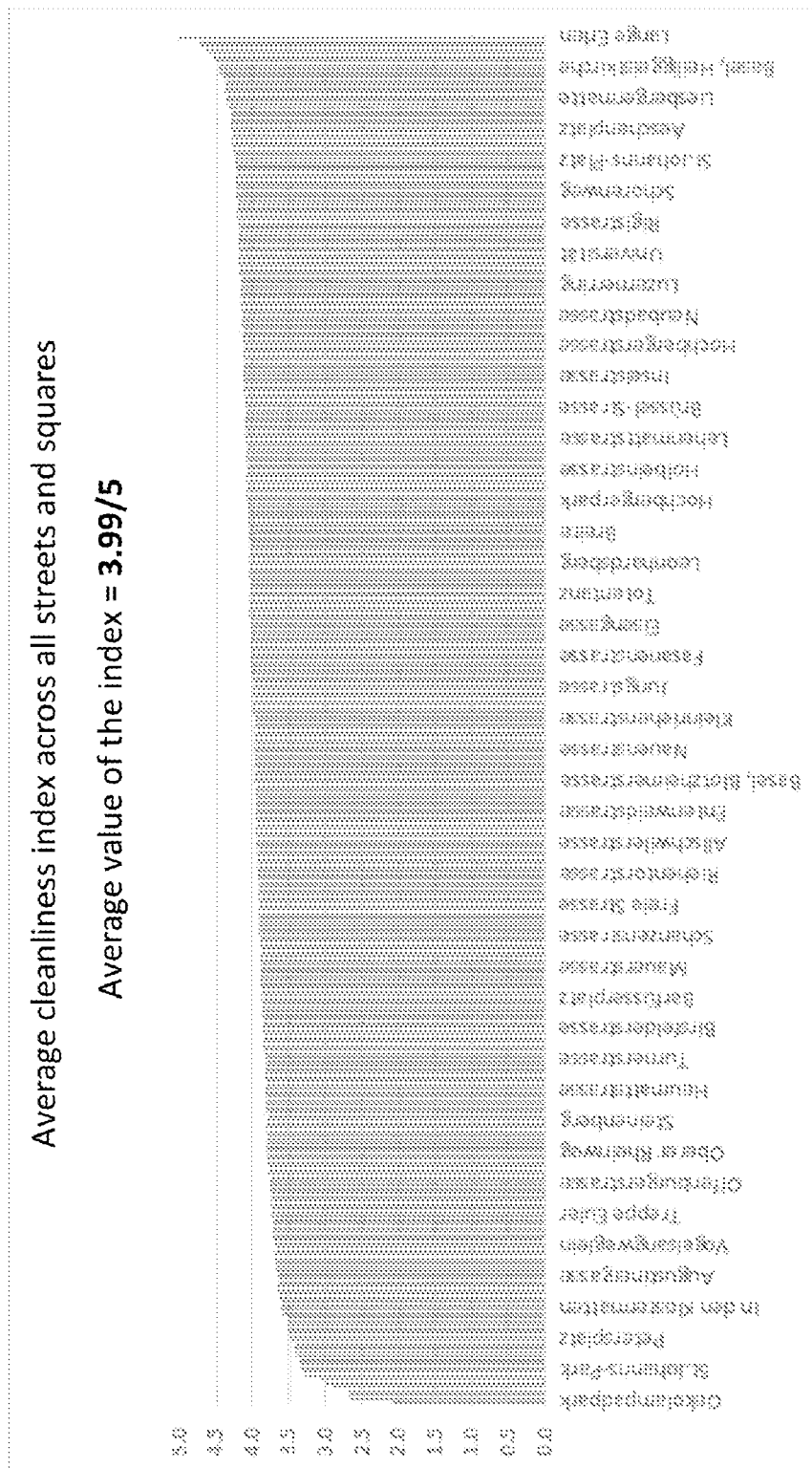

FIG. 10 illustrates the cleanliness index by location (streets and squares), classified in ascending order, from the dirtiest street to the cleanest street.

The examples discussed below relate to the analysis and monitoring of cleanliness in an urban setting.

Of course, the invention is not limited to this field.

Figure 1:
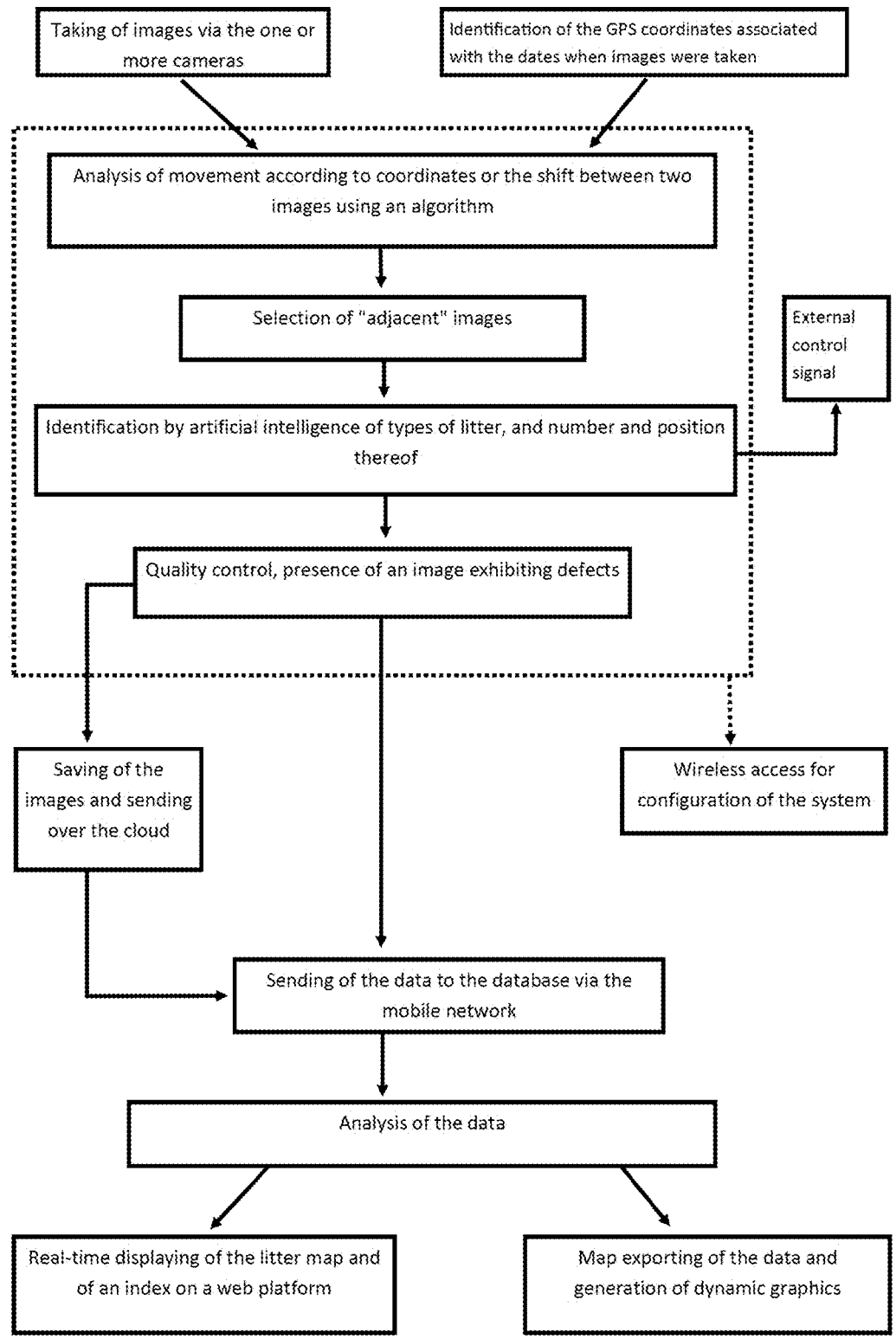
FIG. 1 illustrates the method according to the invention applied to the improvement of cleanliness.
Figure 2:
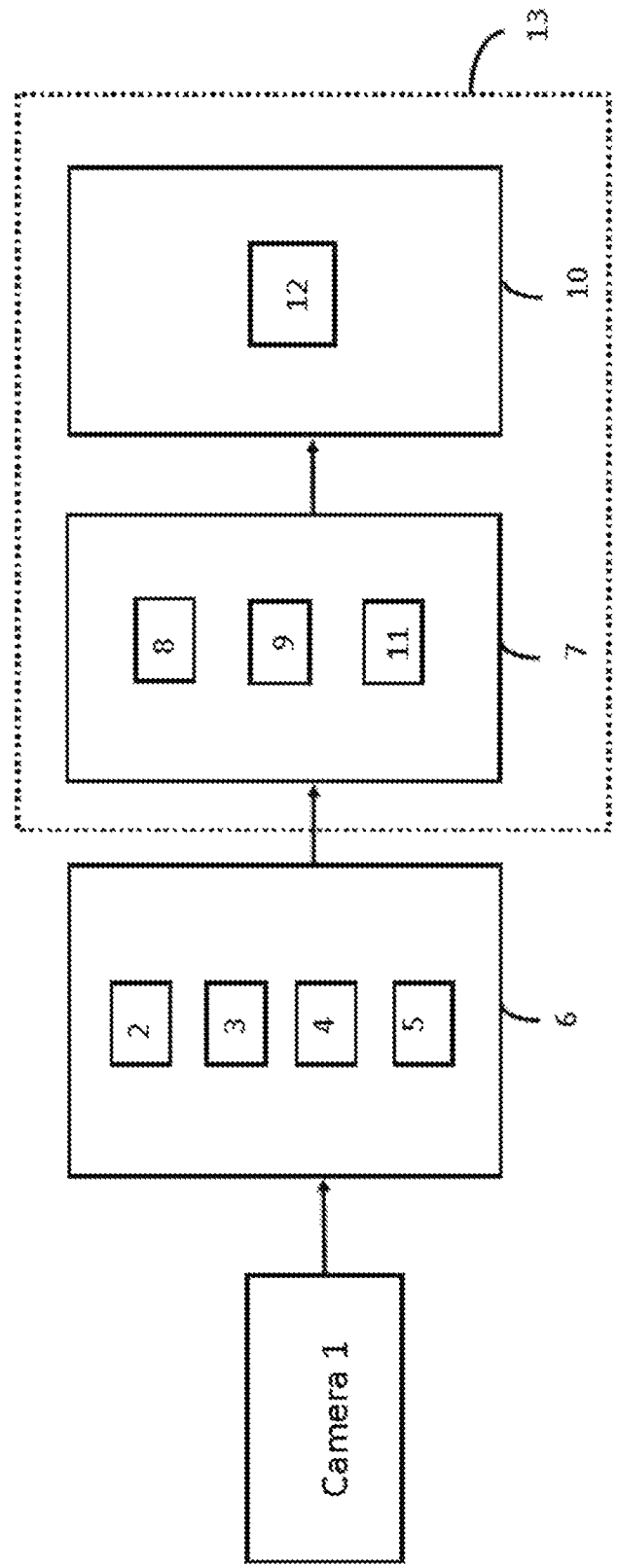
FIG. 2 shows the device and the steps for image exploitation.

The various steps of the method according to the invention are described in FIG. 1.

The camera 1 is secured outside, on a pole, on a door, on a windshield of a vehicle or on a mobile object such as a bicycle. The camera 1 is connected to a central unit 6 arranged close to the camera, e.g. in the vehicle, or in a remote location. The camera 1 is connected to the central unit 6 by a wired connection over a Power over Ethernet module 17. Alternatively, the camera 1—central unit 6 connection is wireless.

The central unit 6 (hardware) consists of a computer 2 (a processor 15, a broker, artificial intelligence, network management and voltage management). An optional internal battery 21, if the central unit is on the vehicle or on the same support as the camera 1, allows data processing by virtue of a buffer if the external power supply 19 is interrupted.

The network is managed by a dedicated unit 3 in order to access data remotely and send them.

Geolocation is carried out by one portion 4 of the central unit 6, by means of an antenna 18.

Another portion 5 of the central unit 6 is a wireless transmission system which makes it possible in particular to configure the system.

Figure 3:
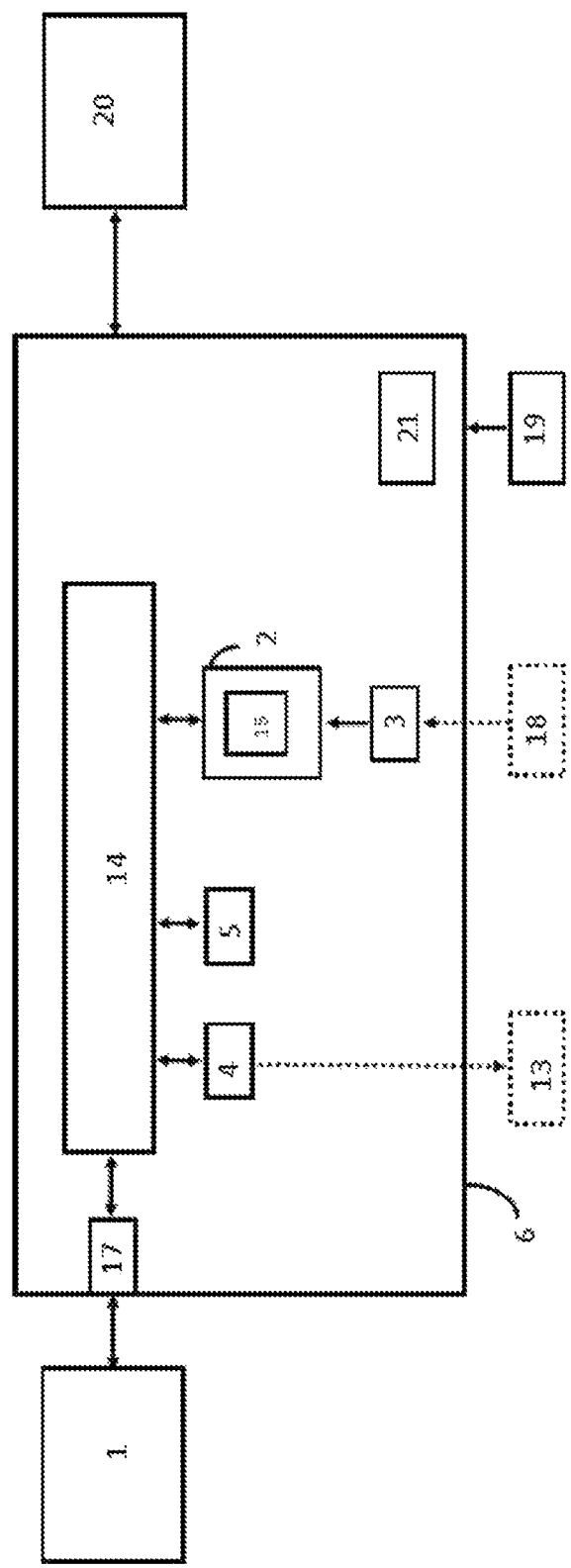
FIG. 3 shows the elements contained in the central unit of the device.

Other elements 17, 4, 5 and 2 illustrated in FIG. 3 are connected to a routing module 14.

The central unit 6 may transmit control signals to the power management unit, in particular of the street sweeper. The central unit 6 may transmit its data to servers 13. These consist of a "front-end" server 10 and of a "back-end" server 7. The "front-end" server manages mapping and monitoring 12 while the "back-end" server 7 manages the database 8, data analyses 9 and reports 11.

Figure 4:
FIG. 4 shows the monitoring of the cleanliness of a city over time.

A city cleanliness map may be established (see FIG. 4) with classification and distribution of the various types of litter according to monitoring 12 or according to files containing data and analyses in the form of reports 11.

The lines with triangles, circles and squares represent the level of dirtiness of each street. The gray dots represent each geolocated point where at least one item of litter was identified, selected and geopositioned. Monitoring may be represented in real time. Its use is mainly focused on information on a daily basis or at a given time (for example Apr. 23, 2018, at 1:00 p.m.).

The elements represented are parameterizable, as are the number and type of litter that are presented.

This information comprises various analyses that are represented using various kinds of diagrams that allow, depending on the use of the data, their exploitation, their comprehension or interpretation in order to afford the user the possibility of making decisions for continuous improvement.

Analysis algorithms allow the results of detections to be exploited by providing, advantageously automatically, continuous improvements, such as for example the analysis of the ideal distance between trash receptacles in relation to the measured cleanliness.

The device according to the invention may also be readily integrated into existing sweeping units.

Measuring urban cleanliness makes it possible to assess and diagnose the cleanliness of a city, in order to improve it while reducing the costs and environmental impacts due to litter.

The invention affords the possibility of continuously measuring urban cleanliness and of rendering the impact of a city's litter on a map.

The invention also makes it possible to plan measures, and then to evaluate and present them, to act and to put in place levers for action (continuous improvement) to make the city cleaner.

FIG. 6 illustrates one exemplary embodiment of the invention in which a camera is secured to a street sweeper.

The device according to the invention allows litter in front of the mobile suction unit (see FIGS. 7 and 8) to be viewed and, with the aid of a camera, for example the suction power to be regulated in order to limit the power consumption of the system (not to use 100% of the power to pick up a cigarette for example, but only 10%).

The system according to the invention measures urban litter objectively and automatically. Cameras are placed on city's street sweepers. Algorithms, e.g. neural networks, identify, classify and count litter and transmit these data in real time.

Each item recognized (cigarette butt, packaging, feces, etc.) is geolocated and classified.

A street sweeper is designed to sweep sidewalks, roads and municipal parks. The litter to be swept up is of all kinds, specific to the urban setting: dead leaves, greasy paper, bottles, cigarette butts, chewing gum, etc. The types of ground surfacing are also highly variable, from the most resistant to the most fragile: asphalt, paving stones, stone slabs, etc.

A suction and sweeping system is most often broken down into 11 elements:
1. a water tank
2. a litter container
3. a water pump
4. spray nozzles
5. a suction port
6. a suction hose
7. screens
8. a fan (blower)
9. side and front screens
10. emptying openings
11. brushes Various suction and sweeping systems exist. The differences are minimal and the operation remains mostly the same.

The water tank is filled before sweeping. The litter container also contains a little water in order to "bind" the dust by wetting.

The water pump supplies the spray nozzles of the brush with water. They operate on demand. Thus, some litter may be wetted if necessary and is collected by two brushes rotating in opposite directions.

The container blower creates low pressure which sucks the waste through the suction port. The recirculation water is sprayed in order to allow the litter to pass more easily from the suction hose to the container. Just before the litter arrives in the container, the air, water and litter are separated.

The air flows through the screens and is expelled by the hydraulically driven blower. The water is separated and flows into the recirculation water tank via the side and front screens. Once in the tank, the water is returned to the suction port by means of a recirculation pump.

The invention affords advantages in particular in the following areas:

1. Optimization of Sweeping

The street sweeper is able to adapt its power demand according to the amount of litter detected, analyzed and mapped. The system is therefore able to know whether it is necessary to use more or less water via the spray nozzles, to increase or decrease the power of the power generator and/or of the suction port, manage the speed of rotation of the brushes, etc.

The system for driving the fan, which reacts according to the litter, has an effect on the combustion engine (or electric motor), the hydraulic pump, the hydraulic motor and the entire system driving the fan.

The street sweeper therefore adapts to its environment and may thus have better efficiency of control of the suction fan. It operates according to external needs and no longer according to a predefined and non-adaptable model.

2. Decreasing the Wear on Street Sweepers

The device according to the invention allows the tools of the street sweeper to be used at the appropriate time with the appropriate power.

The service life of a street sweeper is between 8 and 10 years, or 7,000 to 10,000 operating hours, respectively, on average. The wear is due to its intensive use. The introduction of the Cortexia software makes it possible to know what type of litter it is, how much there is and where it is.

This adaptation makes it possible to significantly reduce the wear on street sweepers at different levels: brushes, suction pipes, seals, filters, suction port, etc.

The service life of the parts is therefore extended and the services to be carried out are reduced.

3. Optimization of Consumption

The street sweeper no longer needs to operate at full capacity continuously. There is a decrease in the use of the engine/motor, which allows the consumption of fossil fuels or electrical power to be decreased, ultimately emitting less pollution.

The amount of water used is regulated according to need: the type and amount of litter. Not all litter needs to be wetted. It is therefore possible to consume less water, which makes it possible to more optimally space apart the "round trips" for filling the tank with water and thus decrease the consumption of heat energy.

4. Detection of Dangerous Elements and Sorting

The data collected by the device of the invention allow settings that are strict and demanding with respect to cleanliness to detect the elements sucked in and to connect them to their source. Taking the example of an airport, the detection of items on the tarmac identified with types of aircraft. In the same vein, street sweepers are also able to sort the accumulated litter according to defined parameters such as dangerousness, safety, and the requirement to recycle.

5. Optimization of Street Sweeper Path

The path of street sweepers may be programmed, and followed manually or automatically, depending on parameters such as the level of dirtiness, the type of litter, the location, the distance to the emptying location or the density of traffic. In this way, street sweepers move "smartly" along roads whose cleanliness actually needs to be improved. In this way, the sometimes unnecessary movement of street sweepers according to a predefined schedule and route is avoided.

6. Analysis of Street Sweeper Routes/Data Use

The algorithms according to the invention make it possible to use the data collected to make a map of the city and thus to provide periodic reports. They make it possible to objectify cleanliness and identify the focuses of intervention (for example, critical types of litter and locations).

A history (space and time) is created and makes it possible to know if the days, the duration and the locations of cleaning are relevant. It is thus possible to adapt to genuine needs.

7. Optimization of Resources

The data collected by the device of the invention allows the street-cleaning service to clean better instead of just cleaning more when it is dirty.

An index reflects the perception of cleanliness on a scale of 0 (dirty) to 5 (clean). The city of Zurich, for example, sets a target of 3.5 to 3.7. Neighborhoods that are consistently above this target are too clean. The city will reallocate these resources to areas that are below target.

The data accumulated makes it possible to automate this allocation of resources and to optimize the continuous improvement loop.

The measurement of cleanliness as proposed may be used/exploited by taking concrete actions for its improvement in cities. The real-time viewing and reports in relation to cleanliness in a location make it possible to take preventive and corrective actions 11 and 12.

Indeed, the levers for action to maintain cleanliness are manifold and their effects on cleanliness will be measurable:
a) better informing the population by raising awareness
b) better informing the population through targeted campaigns
c) better cleaning instead of cleaning more
d) better defining the needs in terms of technical cleaning resources
e) better allocation of technical cleaning resources
f) getting better value out of the work of personnel by virtue of technology
g) better allocation of personnel resources
h) optimization of infrastructure
i) optimization of the use of machines
j) optimization of street furniture
k) improving work efficiency These improvements afforded by the invention are in line with people's perceptions, with costs and the environmental impact.

For example, it is possible to assess the impact of a clean trash receptacle with respect to a dirty trash receptacle in terms of % reduction in litter, by virtue of the data accumulated. With a trash receptacle, it is possible to assess the average distances between two and deduce therefrom the optimal distance for a given level of cleanliness. It is possible to assess the relevance of the site where the trash receptacle is located, and the ideal shape and size thereof in order to have the best efficiency in terms of attractiveness, maintenance, ease of use, and robustness.

The algorithm is able to take into account thousands of possibilities for continuous improvement and to seek the optimum per situation, for a desired perception, a cost, or an environmental impact.

FIGS. 9 and 10 illustrate one example serving as a basis for a continuous improvement tool. In FIG. 9, the diagram represents the level of dirtiness, that is to say the inverse of cleanliness. The larger the number, the more litter is present, here with three types of litter that are dominant in this city, namely paper in first place, cigarettes in second and bottles in third. It is also possible to see the increase in these litter types according to season, with peak dirtiness in August in this tourist town.

In FIG. 9, it is possible to see the change in the value of the cleanliness index over a period of five months between April and August 2019. The values obtained show that some streets are cleaner than others (highest index=clean). The method therefore makes it possible to allocate more resources to where it is dirty, by taking resources from where overquality is observed (too clean). The method according to the invention makes it possible to identify the most appropriate solution to meet a target which would be to balance the use of resources in terms of personnel and equipment.

As mentioned above, the invention is not limited to the analysis and improvement of urban cleanliness.

The invention claimed is:

1. A method for automatically analyzing and monitoring cleanliness in an urban setting, the method comprising:
   planning of measurements of at least one environmental parameter affecting the perception of cleanliness comprising at least one variable element(s) or item that is natural or results of human, animal, or plant activity;
   obtaining, via at least one static or mobile camera, a plurality of images of different real world locations;
   automatically identifying, using a computer system and within different ones of the plurality of images, a plurality of items within the plurality of images;
   obtaining geolocation data and associating the geolocation data with each of the identified plurality of items;
   classifying each of the identified plurality of items, with each item being classified according to a characteristic that includes at least one of category, danger, and typology;
   monitoring and updating of said environmental parameter in real-time by using the plurality of geolocated and classified items; and
   optimizing technical, natural, and human resources to reduce the environmental and operational costs of said resources for cleaning or collecting for the monitored environmental parameter based on the automatic identification of the plurality of items within the plurality of images to reach a targeted cleanliness.

2. The method of claim 1, further comprising:
automatically controlling cleaning or collection tools of a device based on the monitored and updated environmental parameter, wherein the device includes tools for cleaning or collecting in a urban setting and the at least one static or mobile camera connected to a computing device that processes images in real time to thereby identify and classify an environmental parameter within a corresponding image.

3. The method of claim 1, further comprising:
generating at least one predictive route for at least one cleaning or collecting technical resource to travel through an urban setting based on based on geolocation data and/or classification data associated with identified environmental parameters.

4. The method of claim 1, further comprising:
dispatching human resources according to the state of the cleaning or collecting fleet and the demand for cleaning or collecting.

5. The method of claim 1, further comprising:
dynamically controlling water use and/or power user of at least one vehicle based on the geolocation data and/or classification data associated with identified environmental parameters.

6. The method of claim 1, further comprising:
dynamically controlling speed and/or position of at least one brush that is used to clean the surface of a street.

7. The method of claim 3, further comprising:
optimizing the at least one predictive route to reduce operation time, fuel consumption, and/or travel distance of at least one vehicle.

8. The method of claim 1, further comprising:
automatically repeating the optimizing step as part of a continuous improvement loop.

9. A system for cleaning or collecting physical elements from real world locations, the system comprising:
at least one vehicle that includes cleaning or collecting machinery that operates in an urban setting;
at least one static or mobile camera and configured to acquire images of real-world locations; and
a computing system that is coupled to the at least one camera, the computing system configured to perform operations comprising:
planning of measurements of at least one environmental parameter affecting the perception of cleanliness comprising at least one variable element(s) that is natural or results of human, animal, or plant activity;
obtaining, via at least one static or mobile camera, a plurality of images of different real world locations;
automatically identifying, using a computer system and within different ones of the plurality of images, a plurality of items within the plurality of images;
obtaining geolocation data and associating the geolocation data with each of the identified plurality of items;
classifying each of the identified plurality of items, with each item being classified according to a characteristic that includes at least one of category, danger, and typology;
monitoring and updating of said environmental parameter in real-time by using the plurality of geolocated and classified items; and
optimizing technical, natural, and human resources to reduce the environmental and operational costs of said resources for cleaning or collecting the monitored environmental parameter based on the automatic identification of the plurality of items within the plurality of images to reach a targeted cleanliness.

10. The system of claim 9, wherein the operations further comprise:
automatically controlling the cleaning or collecting machinery based on the at least one environmental parameter that has been identified.

11. The system of claim 9, wherein the operations further comprise:
automatically generating at least one route for the at least one vehicle based on the identified, geolocated, and classified at least one environmental parameter; and
communicating the least one route to the at least one vehicle.

12. The system of claim 11, wherein the operations further comprise: at least partly controlling the at least one vehicle based on the at least one route.

13. The system of claim 9, wherein the computing system further comprises a central computing unit that is located on the at least one vehicle and/or on a static location and a remotely located server system that communicates with the central unit, wherein some of the operations are performed by the central computing unit and some of the operations are performed by the remotely located server system.

14. The system of claim 9, wherein the vehicle is a street sweeper.

15. The system of claim 9, wherein the at least one camera is mounted on a vehicle and/or a bicycle, or a drone or on affixed element.

* * * * *